US008515850B2

(12) United States Patent
Clark et al.

(10) Patent No.: US 8,515,850 B2
(45) Date of Patent: Aug. 20, 2013

(54) SYSTEM AND METHOD FOR FORECASTING REALIZED VOLATILITY VIA WAVELETS AND NON-LINEAR DYNAMICS

(75) Inventors: Andrew Clark, Niwot, CO (US); Jeff Kenyon, Boulder, CO (US)

(73) Assignee: Thomson Reuters Global Resources (TRGR), Baar (CH)

( * ) Notice: Subject to any disclaimer, the term of this patent is extended or adjusted under 35 U.S.C. 154(b) by 5 days.

(21) Appl. No.: 13/220,115

(22) Filed: Aug. 29, 2011

(65) Prior Publication Data

US 2012/0078814 A1    Mar. 29, 2012

Related U.S. Application Data

(60) Provisional application No. 61/385,736, filed on Sep. 23, 2010.

(51) Int. Cl.
*G06Q 40/00*    (2012.01)
(52) U.S. Cl.
USPC ............................... 705/36 R; 705/35; 705/37
(58) Field of Classification Search
USPC ........................................................ 705/36 R
See application file for complete search history.

(56) References Cited

U.S. PATENT DOCUMENTS

| | | | |
|---|---|---|---|
| 5,720,294 A | 2/1998 | Skinner | 128/702 |
| 6,012,044 A * | 1/2000 | Maggioncalda et al. | 705/36 R |
| 7,702,548 B2 * | 4/2010 | Zumbach et al. | 705/35 |
| 2002/0019803 A1 * | 2/2002 | Muller | 705/38 |
| 2002/0161677 A1 * | 10/2002 | Zumbach et al. | 705/35 |
| 2003/0149648 A1 * | 8/2003 | Olsen et al. | 705/35 |
| 2004/0078319 A1 * | 4/2004 | Madhavan et al. | 705/38 |
| 2004/0215430 A1 | 10/2004 | Huddleston et al. | 703/2 |
| 2005/0102214 A1 * | 5/2005 | Speth et al. | 705/36 |
| 2007/0239580 A1 * | 10/2007 | Ciampi | 705/35 |
| 2009/0018891 A1 | 1/2009 | Eder | 705/10 |

FOREIGN PATENT DOCUMENTS

| | | |
|---|---|---|
| WO | WO 9215064 A1 * | 9/1992 |
| WO | WO 2012/040284 | 3/2012 |

OTHER PUBLICATIONS

Capinski, Marek, et al., "Mathematics for Finance: An Introduction to Financial Engineering", Springer Verlag, London, U.K., 2003, 74 pages.
Gençay, Ramazan, et al., "An Introduction to Wavelets and Other Filtering Methods in Finance and Economics", Academic Press, San Diego, CA, 2001, 386 pages.

(Continued)

*Primary Examiner* — Gregory Johnson
*Assistant Examiner* — Kevin Poe
(74) *Attorney, Agent, or Firm* — Pillsbury Winthrop Shaw Pittman LLP

(57) ABSTRACT

The system and method described herein may be used to forecast realized volatility via wavelets and non-linear dynamics. In particular, a volatility time series that includes daily volatility values associated with a security may be decomposed into wavelets via multi-resolution analysis and dynamical properties associated with the individual wavelets may be analyzed to identify deterministic and non-deterministic wavelets and produce a volatility forecast derived from a fit computed on the deterministic wavelets. For example, the wavelets may be analyzed to discover time delay, Theiler, and embedding dimension values associated therewith, which may be used to project volatility values associated with each wavelet. The projected volatility values associated with each wavelet may then be summed to produce a volatility forecast associated with the security.

23 Claims, 4 Drawing Sheets

(56) References Cited

OTHER PUBLICATIONS

Kantz, Holger et al., "Nonlinear Time Series Analysis; Second Edition", Cambridge University Press, Cambridge, U.K., 2004, 20 pages.
Tisean 3.0.1—Nonlinear Time Series Analysis; Tisean web site (http://www.mpipks-dresden.mpg.de/~tisean/Tisean_3.0.1/index. html), last accessed on Mar. 16, 2011, http://www.mpipks-dresden.mpg.de/~tisean/Tisean_3.0.1/index.html, 176 pages.
Heston, Steven L., "A Closed-Form Solution for Options with Stochastic Volatility with Applications to Bond and Currency Options," *The Review of Financial Studies*, vol. 6, Issue 2, 1993, pp. 327-343.
Fonseca, Jose da, et al., "A Multifactor Volatility Heston Model," *Quantitative Finance*, vol. 8, No. 6, Sep. 2008, pp. 591-604.
McCauley, Joseph L., "Dynamics of Markets; Econophysics and Finance", Cambridge University Press, 2004, 90 pages.
Calvet, Laurent E., et al., "Multifractal Volatility; Theory, Forecasting, and Pricing", Academic Press, 2008, 278 pages.
Dash, Jan W., "Quantitative Finance and Risk Management", World Scientific Publishing Co., 2005, 36 pages.
Provenzale, A., et al., "Distinguishing Between Low-Dimensional Dynamics and Randomness in Measured Time Series", *Physica D*, vol. 58, 1992, pp. 31-49.
Barahona, Mauricio, et al., "Detection of Nonlinear Dynamics in Short, Noisy Time Series", *Nature*, vol. 381, May 16, 1996, pp. 215-217.
Skinner, James E., et al., "A Reduction in the Correlation Dimension of Heartbeat Intervals Precedes Imminent Ventricular Fibrillation in Human Subjects", *American Heart Journal*, vol. 125, Mar. 1993, pp. 731-743.
Roulston, Mark S., "Estimating the Errors on Measured Entropy and Mutual Information", *Physica D*, vol. 125, 1999, pp. 285-294.
Theiler, James, et al., "Constrained-Realization Monte-Carlo Method for Hypothesis Testing," *Physica D*, vol. 94, 1996, pp. 221-235.
Pfaff, Bernhard, "Analysis of Integrated and Cointegrated Time Series with R", Springer-Verlag, New York. URL http://CRAN.R-project.org/package=urca, 2006, 154 pages.
Mallat, Stephane G., "A Theory for Multiresolution Signal Decomposition: The Wavelet Representation," *IEEE Transactions on Pattern Analysis and Machine Intelligence*, vol. 11, No. 7, Jul. 1989, pp. 674-693.
Kennel, Matthew B., et al., "Determining Embedding Dimension for Phase-Space Reconstruction Using a Geometrical Construction", *Physical Review A*, vol. 45, No. 6, Mar. 15, 1992, 9 pages.
Engle, Robert F., et al., "What Good is a Volatility Model?", Jan. 29, 2001, 29 pages.
Hyndman, Rob J., "Forecasting Functions for Time Series", Version 2.19, Jun. 4, 2011, 55 pages.
Fraley, Chris, et al., "Fractionally Differenced ARIMA aka ARFIRMA (p,d,q) Models", Version 1.3-2, Jun. 9, 2009, 12 pages.
Hegger, Rainer et al., "Practical Implementation of Nonlinear Time Series Methods: The TISEAN Package", arXiv:chao-dyn/9810005v1, Sep. 30, 1998, 27 pages.
"R Language Definition", Version 2.13.1, R Development Core Team, Jul. 8, 2011, 60 pages.
Antonio, Fabio Di Narzo, "R Interface to Tisean Algorithms", RTisean, Jun. 7, 2011, 42 pages.
Antonio, Fabio Di Narzo, "Analysis of Nonlinear Time Series", tseriesChaos, Sep. 16, 2010, 17 pages.
McDonald, Trent, "Analysis of Mark-Recapture Data", Version 2.7, Jul. 30, 2010, 53 pages.
Whitcher, Brandon, "Basic Wavelet Routines for One-, Two-, and Three-Dimensional Signal Processing", Version 1.6.4, Oct. 6, 2010, 82 pages.
Andersen, Torben G., et al., "Modeling and Forecasting Realized Volatility", *Econometrica*, vol. 71, Jan. 2002, pp. 529-626.

* cited by examiner

SYSTEM AND METHOD FOR FORECASTING REALIZED VOLATILITY VIA WAVELETS AND NON-LINEAR DYNAMICS

CROSS-REFERENCE TO RELATED APPLICATIONS

This application claims the benefit of U.S. Provisional Patent Application Ser. No. 61/385,736, entitled "System and Method for Forecasting Realized Volatility via Wavelets and Non-Linear Time Series Analysis," filed Sep. 23, 2010, the contents of which are hereby incorporated by reference in their entirety.

FIELD OF THE INVENTION

The invention generally relates to a system and method for forecasting realized volatility via wavelets and non-linear dynamics, and in particular, to decomposing a volatility time series into wavelets via multi-resolution analysis and analyzing dynamical properties associated with the individual wavelets to identify deterministic and non-deterministic wavelets and produce a volatility forecast from a fit computed on the deterministic wavelets.

BACKGROUND OF THE INVENTION

Much time and effort has been expended in recent decades to develop better volatility models that can improve volatility forecasts, which many financial applications typically use to forecast future returns and volatility associated with securities, bonds, commodities, and other financial instruments. In particular, financial applications that tend to use volatility forecasts include managing risk, pricing and hedging derivatives, timing markets, and constructing portfolios, among others. In these and other related contexts, the predictability associated with the volatility model used to make forecasts tends to be an important factor in determining whether the forecasts can be considered reliable. For example, suitably managing financial risk often requires present knowledge relating to the likelihood that a portfolio will have a future decline in value or whether certain stocks or portfolios should be sold prior to becoming excessively volatile. In another example, developing strategies to effectively trade option contracts may require insight into the volatility that can be expected over a lifetime associated with the option contract, while market makers may widen the bid-ask spread associated with option contracts expected to have high future volatility. Further background relating to volatility models and various challenges associated therewith may be provided in "What Good is a Volatility Model?" and "Modeling and Forecasting Realized Volatility," the contents of which are hereby incorporated by reference in their entirety.

Among single factor stochastic volatility models, the Heston single factor model tends to be the most popular and easiest to implement. In the Heston single factor model, the volatility follows an Ornstein-Uhlenbeck process that generally describes how certain variables linearly transform towards a long-term mean over time, a common economic assumption that applies to stock prices and stock options. As such, to solve the associated pricing and hedging problem, the Heston volatility model may perform a Fourier transform on the probability distribution function associated with the Ornstein-Uhlenbeck process. Later research extended the Heston model to a multi-factor volatility process that can realize long-term and short-term volatilities in addition to implied and skew volatilities, while related research derived option pricing schemes using mathematics that attempted to explain the "smile," skew, and other stylized volatility facts. The connection between the Heston model, described in "A Closed Form Solution for Options with Stochastic Volatility with Applications to Bond and Currency Options," and the later research relating to multi-factor models can be found in the underlying mathematics that invert a function that helps solve the volatility problem, as described in "A Multifactor Volatility Heston Model" and "*Dynamics of Markets*," all of which are hereby incorporated by reference in their entirety.

Building on the Heston single factor model and the related multi-factor models, a multi-fractal model where the fractal value or Hausdorff dimension varies over time were applied to the volatility context. In particular, the multi-fractal model generally assumes that shocks to volatility will be scale invariant, in that daily or short-term shocks will have a long-term volatility impact in much the way that short-term volatility will be impacted. The multi-fractal model, described in "*Multifractal Volatility*," the contents of which are hereby incorporated by reference in their entirety, was claimed to capture the stylized facts associated with volatility, including long memory and intermittency, more effectively than the Heston model and the multi-factor models. However, these claims rest on misleading assumptions common to the multi-fractal interpretation and many standard economic and finance models. For example, standard economic and financial theory provides that market makers instantaneously integrate new price information, which leads to little (if any) attention to the lag between the time when new price information becomes available and the time when the market makers learn about the new price information. Moreover, different market makers may interpret the same news differently, and movements in volatility are not the same at all time scales. Accordingly, the prevailing volatility models, while capturing many important stylized facts associated with volatility, tend to fall short in providing the requisite predictability and stability because certain factors may be marginalized or unconsidered.

In recent years, increases in data availability over shorter time horizons has prompted efforts to forecast volatility over weekly, daily, and other high-frequency time periods and substantial growth in markets associated with volatility swaps, variance swaps, and other derivatives that incorporate information forecasted with volatility models. For example, a volatility swap generally relates to a forward contract on the future realized volatility associated with a particular underlying asset, whereby volatility swaps allow investors to directly trade on the volatility associated with the underlying asset in a substantially similar manner to how investors typically trade on a price index. As such, volatility swaps provide financial instruments that can be used to speculate on future volatility levels or hedge volatility exposure associated with other positions or businesses. In contrast, a variance swap generally relates to a financial derivative that allows investors to trade on the realized volatility associated with a stock index, interest rate, exchange rate, or similar underlying assets (e.g., the VIX ticker symbol represents the implied volatility associated with S&P 500 index options over a next thirty-day period). In this context, the main difference between a volatility swap and a variance swap relates to the profit and loss from a variance swap depending directly on the difference between realized and implied volatility, whereas' a volatility swap depends only on the realized volatility. Despite variance swaps depending on sometimes uncertain and unpredictable implied volatility metrics, commentators discussing the option markets typically use the VIX implied (or expected) volatility measure to represent the overall market sentiment associated with equity options.

However, the relationship between the VIX and individual equity options tends to be overstated, in that the dynamics that drive the volatility associated with index options are different from the dynamics that drive the volatility associated with equity options, and the volatility associated with the two may not correlate in many cases. In particular, VIX quotes are expressed in percentage points, and as noted above, roughly translate to the expected movement in the S&P 500 index over the next thirty-day period on an annualized basis. For example, if the VIX has a current quote at fifteen, the quote represents an expected fifteen percent annualized change over the next thirty days. From this expected annualized change, an analyst can infer that the index option markets expect the S&P 500 to move up or down approximately 4.33 percent over the next thirty days (i.e., fifteen percent divided by the square root of twelve). Thus, S&P 500 index options would be priced with the assumption that a sixty-eight percent (one standard deviation) likelihood exists that the return on the S&P 500 over the next thirty days will have a 4.33 percent magnitude (up or down). Consequently, the VIX does not necessarily provide a suitable measure relating to the market sentiment associated with individual equity options because the VIX measures volatility over a thirty-day period, while the most liquidity associated with non-index equity options tends to be found in the two to six-month maturities. Further, the volatility associated with individual equities typically depends on market sector (e.g., technology stocks are typically assumed to have high volatility, while utility stocks are typically assumed to have low volatility). Accordingly, using one number (e.g., the VIX) to represent the volatility associated with all equity options tends to be overly simplistic, and moreover, carries uncertainty and unpredictability because the VIX and other variance swaps are coincident volatility indicators rather than forward volatility indicators.

SUMMARY OF THE INVENTION

According to one aspect of the invention, the system and method described herein may be used to forecast realized volatility via wavelets and non-linear dynamics. In particular, a volatility time series may be decomposed into individual wavelets via multi-resolution analysis and dynamical properties associated with the individual wavelets may then be examined to determine which wavelets are deterministic, wherein a fit may be computed on various data points associated with the deterministic wavelets. The resulting dynamics (on a per-wavelet basis) may then be used to forecast the remaining data points associated with each wavelet and summed to forecast volatility. Empirical results comparing this approach to volatility forecasting with variance swaps and other volatility forecasting techniques has shown a substantial improvement in the maximum absolute error associated with the system and method described herein versus variance swaps and other volatility forecasting techniques.

According to one aspect of the invention, as noted above, the system and method described herein may produce the realized volatility forecast via wavelets and non-linear dynamics, wherein the realized volatility forecasts may then be validated to backtest the accuracy, predictability, and stability associated therewith and a model used to produce the forecast. At a high level, a data preparation engine may initialize security price data used to discover the model and produce the realized volatility forecast, a model discovery engine may discover various settings that configure the model to evaluate a specific financial instrument, and a production engine may use the discovered model and the settings associated therewith to produce the realized volatility forecast. Furthermore, the production engine may backtest the realized volatility forecast to validate that the model produces accurate, predictable, and stable results, and further to ensure that the model does not drift over time.

According to one aspect of the invention, the data preparation engine may obtain a price time series associated with a particular instrument from one or more data repositories over a particular time period to initialize the security price data that will be used to discover the model and produce the realized volatility forecast associated with a particular instrument. For example, the obtained time series may include daily prices over a previous ten-years or another suitable time period of yearly, quarterly, monthly, or high frequency (e.g., intra-day) price data associated with the instrument. In one implementation, the data preparation engine may then write the price time series obtained from the data repositories to a suitable data structure that stores one record associated with the price time series per line, with individual fields within the record separated with suitable delimiters. Furthermore, the data preparation engine may apply one or more transformations to order the time series and eliminate gaps therefrom.

According to one aspect of the invention, the data preparation engine may then calculate daily return values associated with the instrument over the relevant time period and compute a volatility time series associated with the instrument from the daily return values. In one implementation, the particular volatility measure associated with the observations in the volatility time series may include a standard deviation, difference in prices squared, returns squared, absolute value associated with the difference in prices, or absolute value associated with the returns, while the particular time period covered in the observations associated with the volatility time series may include a standard trading month, a standard trading week, or another suitable time period. In one implementation, the default volatility measure and time period may include the n-day standard deviation associated with the daily return values, which may be used to compute the volatility time series using a common standard deviation statistical function, in which a represents the standard deviation associated with the daily return values and n equals twenty-one. The data preparation engine may then use the volatility time series computed in the standard deviation function as-is, or alternatively transform the volatility time series to an annual percentage volatility (e.g., the standard deviation value may be multiplied by one-hundred to create a percentage value and further multiplied by the square root of two-hundred and fifty-two, which represents the days in a standard trading year.

According to one aspect of the invention, the data preparation engine may then perform a wavelet transform to decompose the volatility time series into various individual wavelets. In particular, the wavelets may be generally similar to Fourier transforms, except that the data preparation engine may use a new set of basis functions to overcome the fixed time-frequency partitioning associated with Fourier transforms. In one implementation, the wavelet transform may utilize a basis function (called the "mother wavelet") that can be stretched and shifted to capture features that may be local in time and frequency with good resolution. For example, wavelet filters may be long in time when capturing low-frequency events and short in time when capturing high-frequency events, whereby the wavelet filters may have good frequency resolution in both contexts. Accordingly, the wavelet transform may combine several shifting and stretching combinations of the mother wavelet and thereby capture and associate all relevant information in a time series with specific time horizons and locations in time. These properties may provide useful ways to visualize and analyze volatility. As such, the data preparation engine may perform a multi-resolution analysis that uses a pyramid algorithm to conduct an additive decomposition on the volatility time series, wherein the volatility time series and a decomposition depth that specifies how many wavelets to produce may provide arguments to a function that performs the multi-resolution analysis. In one implementation, the decomposition depth may be six, which results in the multi-resolution analysis function producing seven wavelets, which include six detail wavelets that respectively correspond to the signal over a certain time span in addition to a seventh "smoothed" wavelet that generally represents the mean or long-term average associated with the volatility time series prior to decomposition, wherein summing the various detail wavelets and the smoothed wavelet may reproduce the volatility time series prior to decomposition.

According to one aspect of the invention, the various wavelets, produced with the multi-resolution analysis function may be passed to the model discovery engine, which may then discover the model that the production engine will subsequently use to produce the realized volatility forecast. In particular, the model discovery engine may analyze properties associated with the individual wavelets to discover a time delay setting and an embedding dimension setting associated with each wavelet, which may configure the model used to produce the realized volatility forecast. In one implementation, to discover the time delay and embedding dimension settings, the model discovery engine may estimate an Average Mutual Information index associated with a particular wavelet, wherein the Average Mutual Information index estimate may be plotted in a user interface. In one implementation, a human analyst may then view the plot associated with the Average Mutual Information index estimate to identify the minimum value appearing in the plot subsequent to the first peak, which may be selected to define the time delay setting associated with the wavelet. The value associated with the time delay setting may then be used to generate a space-time separation plot associated with the wavelet, which may be displayed in the user interface. The human analyst may then read the space-time separation plot to estimate a Theiler time window needed to determine the embedding dimension setting, wherein the Theiler time window may generally include a positive integer indicating a minimum permissible time separation that nearest neighbors may have. As such, values associated with the time delay setting and the Theiler time window may be used to find the embedding dimension setting associated with the wavelet using a false nearest neighbors algorithm.

According to one aspect of the invention, the values associated with the time delay setting, the Theiler time window, and the embedding dimension setting may then be passed to a validation engine, which may determine a maximal Lyapunov exponent associated with the wavelet. In particular, the Lyapunov exponent generally characterizes the separation rate associated with infinitesimally close trajectories in a dynamical system, while the maximal Lyapunov exponent generally indicates the predictability associated with the dynamical system (e.g., the dynamical system may be chaotic if the maximal Lyapunov exponent has a positive value or dissipative if the maximal Lyapunov exponent has a negative value). The validation engine may therefore calculate the maximal Lyapunov exponent to check the predictability associated with the model, wherein the model may be considered dissipative if the maximal Lyapunov exponent has a negative value or chaotic if the maximal Lyapunov exponent has a positive value. In one implementation, the validation engine may then determine whether the maximal Lyapunov exponents associated with the wavelets are non-zero positive values, zero values, or non-zero negative values and invoke the production engine to forecast the volatility associated with each wavelet if the maximal Lyapunov exponent associated with all or most wavelets have non-zero positive values. However, if most wavelets have zero or non-zero negative maximal Lyapunov exponent values, the model has dissipative characteristics and the production engine will not forecast the volatility associated with any wavelet. Further, in one implementation, the validation engine may plot entropy via the user interface to further examine the suitability associated with the derived model (e.g., to evaluate whether any time periods associated with the model show a time period over which the system was ordered and therefore deterministic, meaning a suitable volatility forecast can be produced therefrom).

According to one aspect of the invention, the values associated with the time delay setting and the embedding dimension setting at each resolution level may then be used to initialize the production engine, which may produce the volatility forecast therefrom. Additionally, the production engine may try the forecasting techniques described herein with various different neighbor settings to determine a neighbors value that will be used to produce the volatility forecast at each resolution level. For example, the production engine may invoke a forecasting engine with various different neighbor settings and evaluate which neighbor values produce forecasts that best conform to actual volatility to determine the neighbors value. As such, the forecasting engine may generally use the time delay value, the embedding dimension value, and the neighbors value to obtain a volatility prediction over a particular time period, wherein the prediction may be compared to actual volatility results to backtest the model values if the time period occurred in the past, or alternatively forecast the volatility forecast if the time period will occur in the future. Furthermore, a drift detection engine may determine a time when the volatility was previously forecasted and periodically determine whether the model has drifted (e.g., on an annual basis). For example, the drift detection engine may re-discover the time delay value, the Theiler time window value, the embedding dimension value, and any other relevant values, which may be compared to previous values associated therewith to subjectively determine whether the model has drifted.

According to one aspect of the invention, the production engine may optionally invoke a noise reduction engine to reduce noise associated with each wavelet prior to the forecasting engine obtaining the volatility prediction. For example, the noise reduction engine may perform an orthogonal projection onto a manifold using Euclidean or other suitable metrics to reduce the noise associated with each wavelet. In one implementation, the forecasting engine may then calculate maximum likelihood estimators associated with various parameters in a fractionally-differenced autoregressive integrated moving average (e.g., a locally linear fit) and then use a time series model generated thereby to produce the volatility prediction. Further, the forecasting engine may use an integer parameter to indicate a number of periods associated with the prediction (e.g., twenty-one days out). In one implementation, the forecasting engine may then sum the volatility predictions associated with the various wavelets to obtain the final volatility prediction over the relevant time period. However, if the forecasting engine fails to suitably produce the volatility prediction associated with any wavelet, cached values associated with such wavelets from a previous forecast may be used instead (if available). For example, the cached values from the previous forecast may be used to produce the volatility prediction because changes to the volatility series associated with a particular wavelet may often be relatively minor on a clay-to-day basis. In one implementation, an analytics engine may then analyze the final volatility prediction to assess the accuracy, predictability, or other suitability associated with the volatility prediction (e.g., the analytics engine may determine whether any wavelet has a volatility prediction that appears random at a given resolution level, in which case the volatility prediction associated with that wavelet may be predicted using an integrated autoregressive moving average [ARIMA] method or another suitable technique). Further, the analytics engine may obtain the actual volatility data over the relevant time period (if available because the prediction relates to a previous time period) and generate statistics that indicate a correspondence between the predicted and actual volatility over various time scales.

Other objects and advantages of the invention will be apparent to those skilled in the art based on the following drawings and detailed description.

DETAILED DESCRIPTION

According to one aspect of the invention, the system and method described herein may be used to forecast realized volatility via wavelets and non-linear dynamics. In particular, to forecast realized volatility, the system and method described herein may decompose a volatility time series may into individual wavelets via multi-resolution analysis and then examine dynamical properties associated with the individual wavelets, which may generally include mutual information, Theiler window, embedding dimension, and Lyapunov and Kolmogorov-Sinai exponents. The dynamical properties associated with the wavelets may then be analyzed to determine which wavelets are deterministic, and a fit may be computed on the first seventy percent of the data points associated with the deterministic wavelets. In one implementation, the resulting dynamics per-wavelet may be used to forecast the remaining thirty percent of the data points associated with each wavelet and summed to forecast volatility. Empirical results comparing this approach to volatility forecasts to variance swaps and other volatility forecasting techniques has shown a fifty percent or greater improvement in the maximum absolute error associated with the system and method described herein versus variance swaps and other volatility forecasting techniques.

Figure 1:
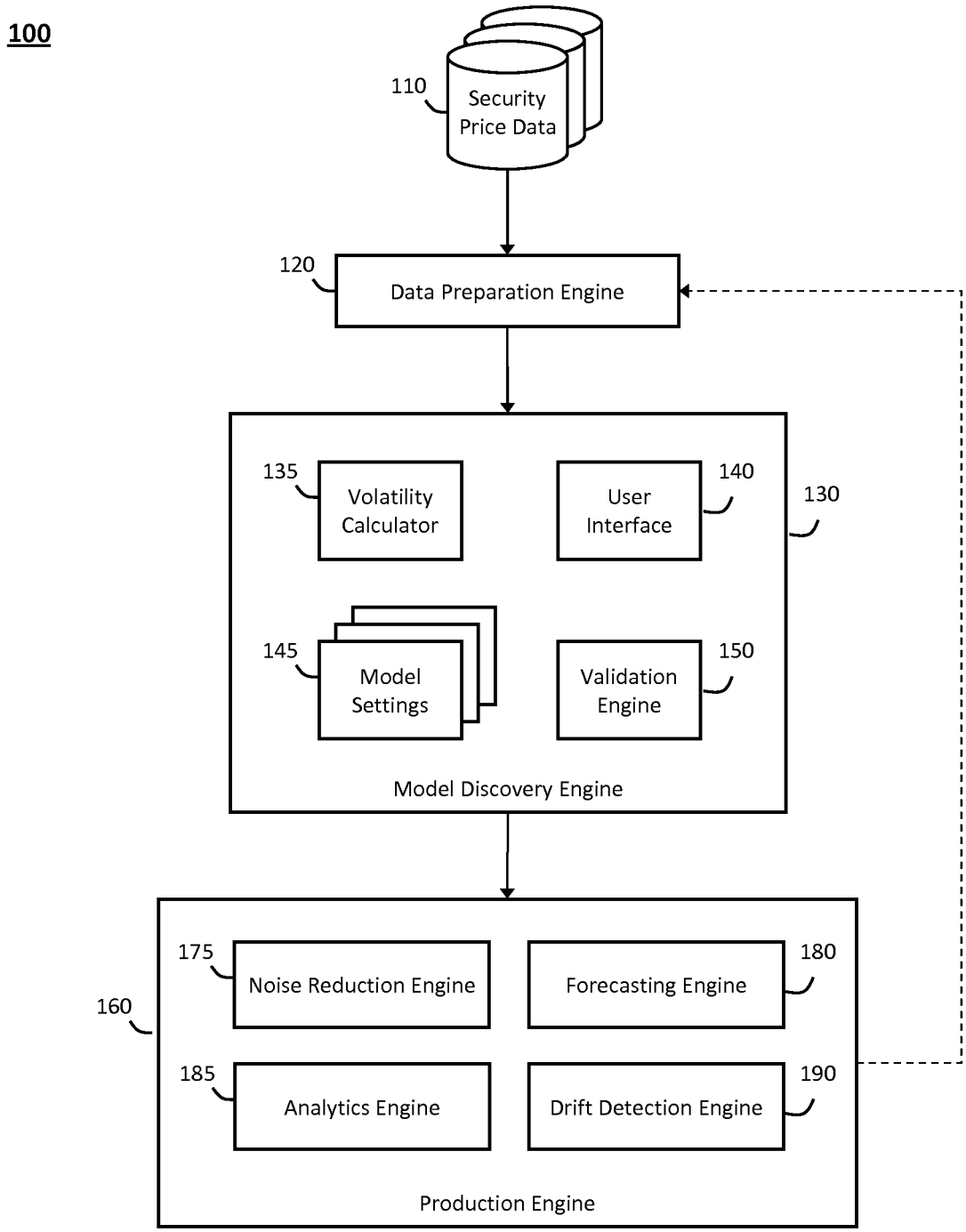
FIG. 1 illustrates an exemplary system to forecast realized volatility via wavelets and non-linear dynamics, according to one aspect of the invention.

According to one aspect of the invention, FIG. 1 illustrates an exemplary system 100 that may be used to forecast realized volatility via wavelets and non-linear dynamics. In particular, implementations of the system 100 may be made in hardware, firmware, software, or any suitable combination thereof. The system 100 may also be implemented as instructions stored on a machine-readable medium that can be read and executed on one or more processing devices. For example, the machine-readable medium may include various mechanisms that can store and transmit information that can be read on the processing devices or other machines (e.g., read only memory, random access memory, magnetic disk storage media, optical storage media, flash memory devices, or any other storage or non-transitory media that can suitably store and transmit machine-readable information). Furthermore, although firmware, software, routines, or instructions may be described herein with respect to certain exemplary aspects and implementations performing certain actions or operations, it will be apparent that such descriptions are merely for the sake of convenience and that such actions or operations in fact result from processing devices, computing devices, processors, controllers, or other hardware executing the firmware, software, routines, or instructions. Moreover, to the extent this disclosure describes executing or performing certain operations or actions in a particular order or sequence, such descriptions are exemplary only and such operations or actions may be performed or executed in any suitable order or sequence.

In one implementation, the system 100 illustrated in FIG. 1 may generally produce a realized volatility forecast via wavelets and non-linear dynamics and validate the realized volatility forecast to backtest the accuracy, predictability, and stability associated with the realized volatility forecast and a model that the system 100 used to produce the realized volatility forecast. At a high level, the system 100 may generally include a data preparation engine 120 that initializes security price data used to discover the model and produce the realized volatility forecast, which may be stored in one or more data repositories 110, a model discovery engine 130 to discover various settings 145 that may configure the model to evaluate a specific financial instrument associated with the realized volatility forecast (e.g., a particular index, equity, commodity, etc.), and a production engine 160 that uses the discovered model and the associated settings 145 to produce the realized volatility forecast. Furthermore, in one implementation, the production engine 160 may backtest the realized volatility forecast to validate that the model used to produce the realized volatility forecast produces accurate, predictable, and stable results. In one implementation, the functionality associated with the data preparation engine 120, the model discovery engine 130, and the production engine 160 that will be described in further detail herein may be programmed in the R statistical language, which often serves as a "wrapper" to publicly available underlying programming, such as that done in C# or other suitable programming languages (e.g., as described in "R Language Definition" and various additional resources available at cran.r-project.org, the contents of which are hereby incorporated by reference in their entirety).

In one implementation, to initialize the security price data that will be used to discover the model and produce the realized volatility forecast associated with a particular financial instrument, the data preparation engine 120 may obtain a price time series associated with the instrument from the data repositories 110 over a particular time period (e.g., prices over a previous ten-year period), wherein the obtained price time series may include yearly, quarterly, monthly, daily, or high frequency (e.g., intra-day) price data associated with the instrument. In one implementation, the data preparation engine 120 may then write the price time series obtained from the data repositories 110 to a flat file or other suitable data structure that stores one record associated with the price time series per line, with individual fields within the record separated according to commas or other suitable delimiters. Further, in one implementation, the data preparation engine 120 may apply one or more transformations to suitably order and eliminate any gaps from the price time series within the data structure (e.g., the data preparation engine 120 may eliminate any lines in the price time series that are empty, represent duplicate entries, or otherwise lack data that may be deemed necessary, relevant, or appropriate to produce and/or backtest the realized volatility forecast).

In one implementation, the data preparation engine 120 may then calculate daily return values associated with the instrument over the time period using the following function, in which R represents the return value, $P_0$ represents the price associated with the instrument at time zero, and $P_1$ represents the price associated with the instrument at time step one:

$$R = \frac{P_1 - P_0}{P_0}$$

In one implementation, the data preparation engine 120 may then compute a volatility time series associated with the instrument, wherein the particular volatility measure and time period that the individual volatility observations cover may be defined in various ways. For example, the volatility measure used in the volatility time series may include a standard deviation, difference in prices squared, returns squared, absolute value associated with the difference in prices, or absolute value associated with the returns, while the particular time period that the individual volatility observations cover may include a standard trading month, a standard trading week, or another suitable time period. In one implementation, the default volatility measure and time period may include the n-day standard deviation associated with the daily return values, which may be used to compute the volatility time series using the following function, in which σ represents the standard deviation associated with the daily return values, $x_i$ represents the return value associated with sample i, $\bar{x}$ represents the mean return value, and n equals twenty-one (i.e., a standard trading month):

$$\sigma = \sqrt{\frac{\sum [(x_i - \bar{x})]^2}{n - 1}}$$

In one implementation, the data preparation engine 120 may use the volatility time series computed with the above function as-is, or alternatively may transform the volatility time series to an annual percentage volatility according to standard industry practice. For example, in response to determining that the system 100 has been configured to annualize the volatility time series, the data preparation engine may multiply the standard deviation value computed with the function by one-hundred (i.e., to create a percentage value) and the square root of two-hundred and fifty-two (i.e., the days in a standard trading year).

In one implementation, the data preparation engine 120 may then perform a wavelet transform to decompose the volatility time series into a series that includes various individual wavelets using the mra function in the R package waveslim, which are respectively described in further detail in "Analysis of Mark-Recapture Data" and "Basic Wavelet Routines For One-, Two- and Three-Dimensional Signal Processing," the contents of which are hereby incorporated by reference in their entirety. In particular, the wavelets may be generally similar to Fourier transforms, except that the data preparation engine 120 may use a new set of basis functions to overcome the fixed time-frequency partitioning associated with Fourier transforms. In one implementation, the wavelet transform may utilize a basis function (called the "mother wavelet") that can be stretched and shifted to capture features that may be local in time and frequency with good resolution. For example, wavelet filters may be long in time when capturing low-frequency events and short in time when capturing high-frequency events, whereby the wavelet filters may have good frequency resolution in both contexts. Accordingly, the wavelet transform may combine several shifting and stretching combinations of the mother wavelet and thereby capture and associate all relevant information in a time series with specific time horizons and locations in time. These properties may provide useful ways to visualize and analyze volatility (e.g., as described in "*An Introduction to Wavelets and Other Filtering Methods in Finance and Economics*," the contents of which are hereby incorporated by reference in their entirety). As such, the R package waveslim provides various routines to conduct time series analysis based on wavelets, whereby the data preparation engine 120 uses the mra function in the waveslim package to execute a multi-resolution analysis that performs an additive decomposition on the volatility time series described above using the pyramid algorithm described in "A Theory For Multiresolution Signal Decomposition: The Wavelet Representation," the contents of which are hereby incorporated by reference in their entirety. As such, in one implementation, arguments that the data preparation engine 120 passes to the mra function may include the volatility time series and a decomposition depth that specifies how many wavelets to produce. In one implementation, the decomposition depth may be six, which results in the mra function producing seven wavelets, which include six detail wavelets. D1-D6 that each correspond to the signal over a certain time span. For example, if the volatility time series relates to daily data, the D3 wavelet would show the volatility contribution at $2^3$ (i.e., eight days), the D4 wavelet would show the volatility contribution at $2^4$ (i.e., sixteen days), and so on. Further, the seventh wavelet may include a smoothed wavelet S6 that generally represents the mean or long-term average associated with the volatility time series, wherein the six detail wavelets D1-D6 and the seventh smoothed wavelet S6 may be summed to reproduce the volatility time series prior to decomposition.

In one implementation, the data preparation engine 120 may then pass the various wavelets produced with the mra function to the model discovery engine 130 to discover the model that the production engine 130 will subsequently use to produce the realized volatility forecast. More particularly, the model discovery engine may analyze properties associated with the individual wavelets D1-D6 and 56 passed from the data preparation engine 120 to discover a time delay setting 145 and an embedding dimension setting 145 associated with each wavelet D1-D6 and 56, which may configure the model used to produce the realized volatility forecast. In one implementation, to discover the time delay and embedding dimension settings 145, the model discovery engine 130 may use various functions in the R package tseriesChaos, described in further detail in "Analysis of Nonlinear Time Series," the contents of which are hereby incorporated by reference in their entirety. For example, to obtain the time delay setting 145, a volatility calculator 135 may execute the mutual function in the tseriesChaos package to estimate the Average Mutual Information (AMI) index associated with a particular wavelet. In one implementation, the volatility calculator 135 may then plot the AMI index estimate (e.g., in a bi-dimensional density histogram displayed in a user interface 140). In one implementation, a human analyst may then view the plot associated with the AMI index estimate to identify the minimum value appearing in the plot subsequent to the first peak, which the human analyst may select to define the time delay setting 145 associated with the wavelet.

In one implementation, in response to plotting the estimated AMI index and appropriately defining the value associated with the time delay setting 145, the volatility calculator 135 may then pass the value associated with the time delay setting 145 to the stplot function in the tseriesChaos package to generate a space-time separation plot associated with the wavelet. In particular, the space-time separation plot may generally represent the probability that two data points in the reconstructed phase-space has a distance smaller than epsilon ("$\epsilon$"), which may depend on the spatial distance $\epsilon$ and the difference in time $\Delta t$ between the points (e.g., as described in "Distinguishing Between Low Dimensional Dynamics and Randomness in Measured Time Series," the contents of which are hereby incorporated by reference in their entirety). In other words, the space-time separation plot may create an accumulated histogram that includes the spatial distances $\epsilon$ at each time separation $\Delta t$, which may be displayed in the user interface 140. The human analyst may then read the space-time separation plot to estimate a Theiler time window setting 145 needed to determine the embedding dimension setting 145, wherein the Theiler time window 145 may generally include any suitable positive integer that indicates a minimum permissible time separation that nearest neighbors may have (e.g., to determine temporally correlated points relevant to a nearest neighbors search performed to define the embedding dimension setting 145). As such, the volatility calculator 135 may then pass values associated with the time delay setting 145 and the Theiler time window 145 to the false.nearest function in the tseriesChaos package, which may find the embedding dimension setting 145 associated with the wavelet using the false nearest neighbors algorithm described in "*Practical Implementation of Non-Linear Time Series Methods—The TISEAN Package*," the contents of which are hereby incorporated by reference in their entirety.

In one implementation, values associated with the time delay setting 145, the Theiler time window 145, and the embedding dimension setting 145 may then be passed to a validation engine 150, which may execute the lyap_k function in the tseriesChaos package to determine a maximal Lyapunov exponent 145 associated with the wavelet using algorithms described in "Practical Implementation of Non-Linear Time Series Methods—The TISEAN Package," which was incorporated by reference above. In particular, the Lyapunov exponent 145 generally characterizes the separation rate associated with infinitesimally close trajectories in a dynamical system, which typically have multiple Lyapunov exponents equal in number to the dimensionality associated with the phase space. In this context, the maximal Lyapunov exponent 145 generally determines the predictability associated with the dynamical system, wherein the dynamical system may be chaotic if the maximal Lyapunov exponent 145 has a positive value or dissipative if the maximal Lyapunov exponent 145 has a negative value. Accordingly, in one implementation, the validation engine 150 may calculate the maximal Lyapunov exponent 145 to check the predictability associated with the model (i.e., the values associated with the time delay and embedding dimension settings 145, which generally configure the production engine 160 to produce the realized volatility forecast). For example, if the maximal Lyapunov exponent 145 calculated with the validation engine 150 has a negative value, the model may be considered dissipative, whereas the model may be considered chaotic if the maximal Lyapunov exponent 145 has a positive value.

In one implementation, in response to calculating the maximal Lyapunov exponent 145 associated with all the wavelets, the validation engine 150 may then determine whether the maximal Lyapunov exponents 145 associated with the wavelets are non-zero positive values, zero values, or non-zero negative values. In particular, if the validation engine 150 determines that the maximal Lyapunov exponent 145 associated with all or most wavelets have non-zero positive values, the validation engine 150 may determine that the model can be considered chaotic and invoke the production engine 160 to forecast the volatility associated with each wavelet (e.g., because chaotic time series can be used to understand, interpret, and predict observed chaotic dynamical behavior). However, in response to the validation engine 150 determining that the maximal Lyapunov exponent 145 associated with most wavelets are either zero or non-zero negative values, the validation engine 150 may determine that the model has dissipative characteristics and the production engine 160 will not produce the volatility forecast associated with any wavelet (i.e., because dissipative systems cannot fill the phase space volume). Furthermore, in one implementation, the validation engine 150 may plot entropy via the user interface 140 to further examine the suitability associated with the model derived with the model discovery engine 130. For example, the entropy plotted via the user interface 140 may generally represent the order or disorder associated with the model (e.g., the chaos associated with the model), wherein the entropy plot may be examined to evaluate whether any time periods associated with the model show an ordered system (i.e., that there was a time period over which the system was ordered and therefore deterministic, meaning that the production engine 160 can likely produce a suitable volatility forecast therefrom).

In one implementation, values associated with the time delay setting 145 and the embedding dimension setting 145 at each resolution level may then be used to initialize the production engine 160, which may produce the volatility forecast therefrom. Additionally, in one implementation, the production engine 160 may determine a neighbors value at each resolution level to produce the volatility forecast, wherein the production engine 160 may try the forecasting techniques described herein with various different neighbor settings to determine the neighbors value. For example, to determine the neighbors value, the production engine 160 may invoke a forecasting engine 180 with various different neighbor settings and evaluate which neighbor values produce forecasts that best conform to actual volatility. In one implementation, empirical research has shown that twenty-five generally provides a suitable default neighbors value. As such, in one implementation, the forecasting engine 180 may use the values associated with the time delay setting 145, the embedding dimension setting 145, and the neighbors value to obtain a volatility prediction over a particular time period, wherein the prediction may be compared to actual volatility results to backtest the model values if the time period already occurred in the past, or alternatively the prediction may be considered the volatility forecast if the time period will occur in the future. Further, in one implementation, a drift detection engine 190 may determine a time when the volatility was previously forecasted and determine whether the model has drifted if the volatility was last forecasted more than a certain time in the past. For example, if the volatility was last forecasted one year ago, the drift detection engine 190 may cause the model discovery engine 130 to re-discover the values associated with the time delay setting 145, the Theiler time window, and the embedding dimension setting 145, wherein the current and previous values associated therewith may be analyzed to determine whether the model has drifted (e.g., if a substantial difference exists between the current and previous values, which may be a subjective decision made by the human analyst).

In one implementation, the forecasting engine 180 may obtain the wavelets previously decomposed from the volatility time series to initialize obtaining the volatility prediction over the time period in question, wherein the wavelets may cover the time period leading up to and ending on the date from which the volatility will be forecasted. In one implementation, the production engine 160 may optionally invoke a noise reduction engine 175 to reduce noise associated with each wavelet prior to the forecasting engine 180 obtaining the volatility prediction. For example, to reduce the noise associated with each wavelet, the noise reduction engine 175 may perform an orthogonal projection onto a manifold using Euclidean or other suitable metrics using the ghkss function in the R package RTisean, described in "R Interface to Tisean Algorithms," the contents of which are hereby incorporated by reference in their entirety. In one implementation, the forecasting engine 180 may then calculate maximum likelihood estimators associated with various parameters in a fractionally-differenced autoregressive integrated moving average (ARIMA) model using the fracdiff function in the R package forecast, described in "Fractionally Differenced ARIMA aka ARFIRMA (p,d,q) models," the contents of which are hereby incorporated by reference in their entirety. In one implementation, the forecasting engine 180 may then pass a time series model generated via the fracdiff function to the forecast function in the forecast package to produce the volatility prediction. Further, the forecasting engine 180 may pass an integer parameter that indicates a number of periods associated with the prediction (e.g., twenty-one days out), wherein values associated with the volatility prediction for each wavelet may include the mean values that the forecast function generates for each wavelet. In one implementation, in response to producing the volatility prediction associated with the seven wavelets D1-D6 and S6, the forecasting engine 180 may then sum the seven volatility predictions to obtain the final volatility prediction over the relevant time period.

In one implementation, if the forecasting engine 180 fails to suitably produce a volatility prediction associated with any wavelet D1-D6 or 56, the forecasting engine 180 may use cached values associated with such wavelets from a previous forecast (if available), wherein the cached values from the previous forecast may be used to produce the volatility prediction because changes to the volatility series associated with a particular wavelet may be (and likely are) relatively minor on a day-to-day basis. For example, the forecasting engine 180 may generally use locally linear fits to produce the volatility prediction associated with the individual wavelets, which may be subject to sanity checks that evaluate whether the volatility prediction can possibly be true. If any volatility prediction fails the sanity checks, the forecasting engine 180 may change a distance metric parameter, not include a single orbit parameter, reduce a time delay, or any suitable combination thereof and re-execute the volatility prediction. In one implementation, an analytics engine 185 may then analyze the final volatility prediction to assess the accuracy, predictability, or other factors that may indicate the suitability associated with the volatility prediction. For example, in one implementation, the analytics engine 185 may determine whether the volatility prediction associated with any wavelet appears essentially random at a given resolution level (e.g., no volatility pattern appears at a one or two day resolution level), in which case the volatility prediction associated with that wavelet may be predicted using an integrated autoregressive moving average (ARIMA) method or another suitable technique. Furthermore, in response to producing and summing the volatility prediction associated with the seven wavelets D1-D6 and S6 to obtain the final volatility prediction over the relevant time period, the analytics engine 185 may obtain the actual volatility data over the relevant time period if available (i.e., where the time period occurred in the past). As such, if the volatility forecast relates to a prior time period, the analytics engine 185 may further generate statistics that indicate a correspondence between the predicted and actual volatility over the time period (e.g., correlation, Root Mean Square Error, etc.), and furthermore to examine the correspondence between the predicted and actual volatility over various time scales (e.g., five, ten, fifteen, and twenty-one days).

Figure 2:
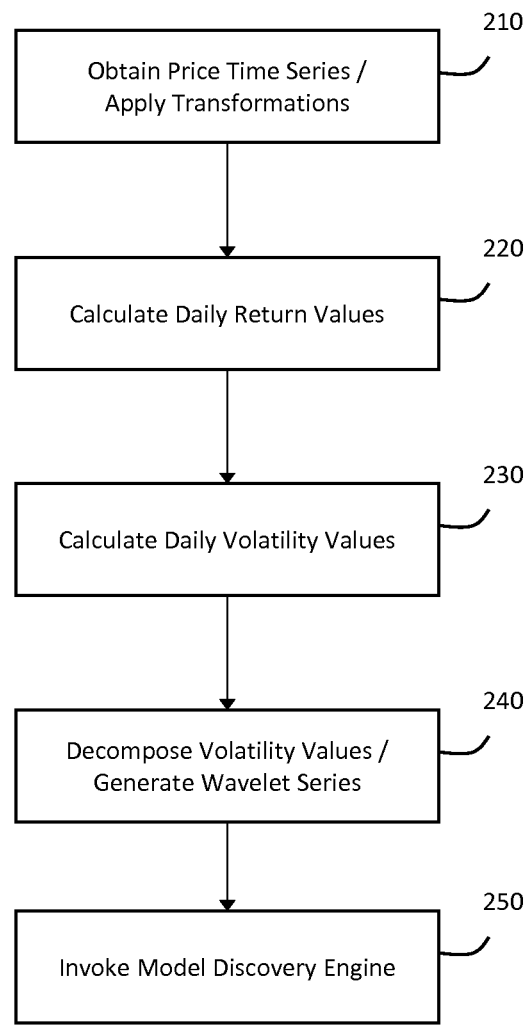
FIG. 2 illustrates an exemplary method to prepare security data that may be used to forecast realized volatility, according to one aspect of the invention.

According to one aspect of the invention, FIG. 2 illustrates an exemplary method 200 to prepare security data that may be used to forecast realized volatility. In particular, at a high level, the method 200 shown in FIG. 2 may include a data preparation engine initializing security price data that will be used to discover a model that will be used to produce the realized volatility forecast. For example, in one implementation, the method 200 illustrated in FIG. 2 may include an operation 210, in which the data preparation engine may obtain a price time series associated with a particular financial instrument from the data repositories over a particular time period (e.g., prices over a previous ten-years or another suitable time period). Furthermore, in one implementation, the price time series obtained in operation 210 may include yearly, quarterly, monthly, daily, or higher frequency (e.g., intra-day) prices associated with the instrument. In one implementation, operation 210 may further include the data preparation engine writing the price time series to a flat file or another suitable data structure that stores one record associated with the price time series per line, with individual fields within the record separated according to commas or other suitable delimiters. Furthermore, operation 210 may include the data preparation engine applying one or more transformations to suitably order and eliminate any gaps from the price time series (e.g., eliminating any lines in the price time series that are empty, represent duplicate entries, or otherwise lack data that may be deemed necessary, relevant, or appropriate to initializing the security price data).

In one implementation, the data preparation engine may then calculate daily return values associated with the instrument over the time period in an operation 220. For example, in one implementation, the daily return values may be calculated using the following function, in which R represents the return value, $P_0$ represents the price associated with the instrument at time zero, and $P_1$ represents the price associated with the instrument at time step one:

$$R = \frac{P_1 - P_0}{P_0}$$

In one implementation, the data preparation engine may then compute a volatility time series that includes daily volatility values associated with the instrument in an operation 230, wherein a volatility measure and time period that the individual volatility observations cover may be defined in various ways. For example, the volatility measure used in the volatility time series may include a standard deviation, difference in prices squared, returns squared, absolute value associated with the difference in prices, or absolute value associated with the returns, while the particular time period that the individual volatility observations cover may include a standard trading month, a standard trading week, or another suitable time period. In one implementation, the default volatility measure and time period may include the n-day standard deviation associated with the daily return values, which may be used to compute the volatility time series using the following function, in which σ represents the standard deviation associated with the daily return values, $x_i$ represents the return value associated with sample i, $\bar{x}$ represents the mean return value, and n equals twenty-one (i.e., a standard trading month):

$$\sigma = \sqrt{\frac{\sum [(x_i - \bar{x})]^2}{n-1}}$$

In one implementation, the data preparation engine may use the volatility time series computed with the above function as-is, or alternatively, operation 230 may further include the data preparation engine transforming the volatility time series into an annual percentage volatility according to standard industry practice. For example, to annualize the volatility time series, operation 230 may include the data preparation engine multiplying the standard deviation value computed with the above function by one-hundred (i.e., to create a percentage value) and then further multiplying the resulting value by the square root of two-hundred and fifty-two (i.e., the days in a standard trading year).

In one implementation, the data preparation engine may then perform a wavelet transform to decompose the volatility time series into a series that includes various individual wavelets in an operation 240, wherein the data preparation engine may use the mra function in the R package waveslim to decompose the volatility time series into the wavelet series. In particular, as noted above, the wavelets may be generally similar to Fourier transforms, except that the data preparation engine 120 may use a new set of basis functions to overcome the fixed time-frequency partitioning associated with Fourier transforms. In one implementation, the wavelet transform may utilize a basis function (called the "mother wavelet") that can be stretched and shifted to capture features that may be local in time and frequency with good resolution. For example, wavelet filters may be long in time when capturing low-frequency events and short in time when capturing high-frequency events, whereby the wavelet filters may have good frequency resolution in both contexts. Accordingly, the wavelet transform may combine several shifting and stretching combinations of the mother wavelet and thereby capture and associate all relevant information in a time series with specific time horizons and locations in time. As such, the properties associated with the wavelets produced from decomposing the volatility time series may provide useful ways to visualize and analyze volatility, whereby the data preparation engine may use the waveslim package and the mra function associated therewith in operation 240 to execute a multi-resolution analysis that performs an additive decomposition on the volatility time series using a pyramid algorithm. In one implementation, arguments passed to the mra function may include the volatility time series and a decomposition depth to specify how many wavelets the mra function will produce. For example, in one implementation, the decomposition depth may be six, which would result in the mra function producing seven wavelets, including six detail wavelets D1-D6 that respectively correspond to the signal over certain time spans (e.g., if the volatility time series relates to daily data, the D3 wavelet would show the volatility contribution at $2^3$ or eight days, the D4 wavelet would show the volatility contribution at $2^4$ or sixteen days, etc.). Furthermore, the wavelets generated in operation 240 may include a smoothed wavelet S6 that represents the mean or long-term average associated with the original volatility time series, wherein the smoothed wavelet S6 may be summed with the individual detail wavelets D1-D6 to reproduce the original volatility time series (i.e., prior to decomposition operation 240). In one implementation, a model discovery engine may then be invoked in an operation 250 to discover the model that will be used to produce the realized volatility forecast, whereby operation 250 may further include passing the various wavelets produced with the mra function to the model discovery engine to enable such discovery.

Figure 3:
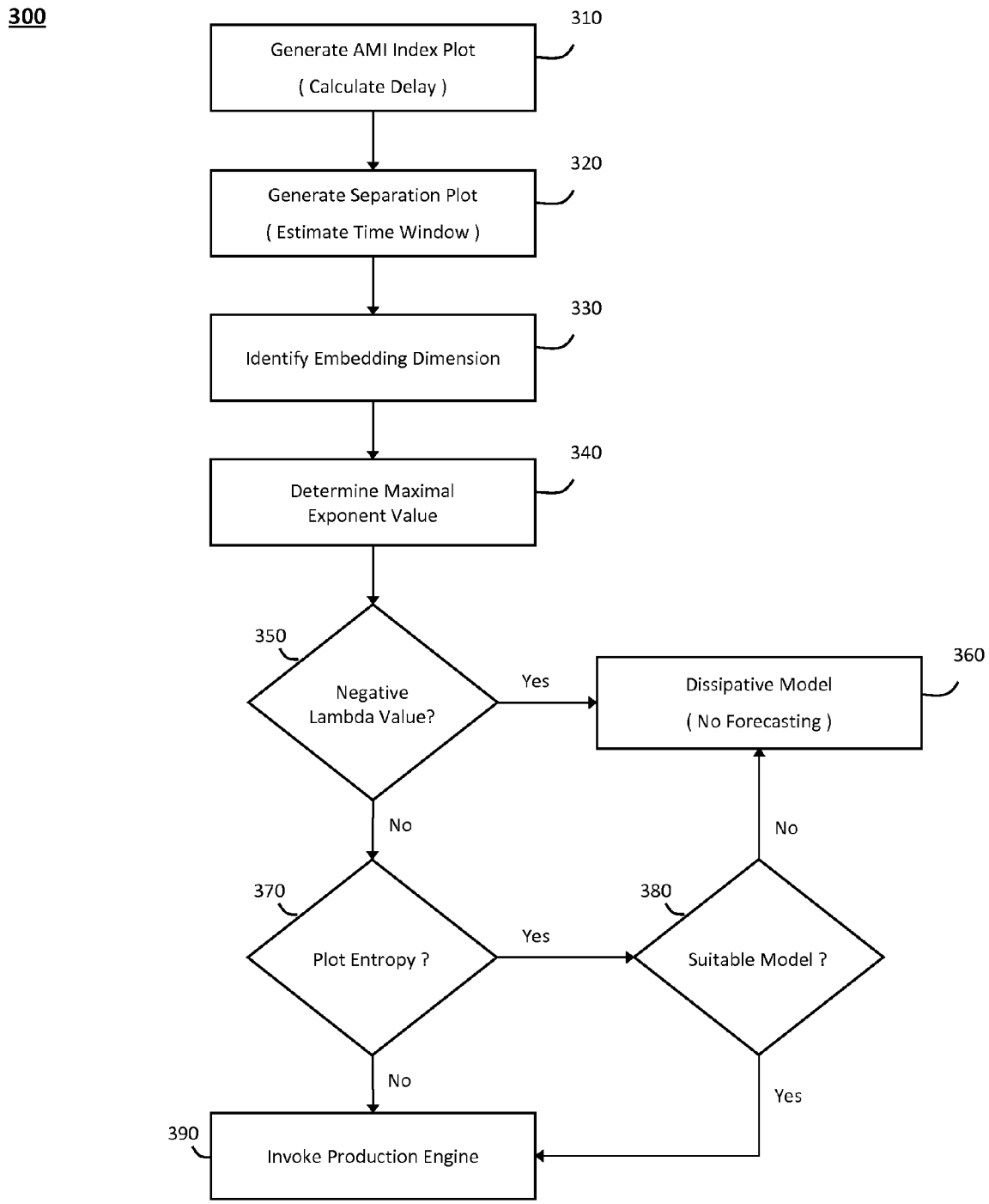
FIG. 3 illustrates an exemplary method to discover settings associated with a model that may be used to forecast realized volatility, according to one aspect of the invention.

According to one aspect of the invention, FIG. 3 illustrates an exemplary method 300 to discover settings associated with a model that may be used to forecast realized volatility. In particular, the method 300 shown in FIG. 3 may be performed in response to the data preparation engine passing the various wavelets produced with the multi-resolution analysis function to the model discovery engine, which may then execute the method 300 illustrated in FIG. 3 to discover the model that the production engine will subsequently use to produce the realized volatility forecast. For example, the model discovery engine may analyze properties associated with the individual wavelets D1-D6 and S6 passed from the data preparation engine to discover a time delay setting and an embedding dimension setting associated with each wavelet D1-D6 and S6, which may configure the model used to produce the realized volatility forecast.

In one implementation, the method 300 illustrated in FIG. 3 may include the model discovery engine estimating an Average Mutual Information index associated with a particular wavelet to calculate the time delay setting in an operation 310 (e.g., using the mutual function in the R package tseriesChaos). In one implementation, operation 310 may further include the model discovery engine plotting the Average Mutual Information index estimate (e.g., in a bi-dimensional density histogram displayed in a user interface), wherein a human analyst may then view the plot associated with the Average Mutual Information index estimate to select the minimum value appearing in the plot subsequent to the first peak, which may be used to define the time delay setting associated with the wavelet. In one implementation, in response to plotting the estimated Average Mutual Information index and appropriately defining the time delay value, an operation 320 may include the model discovery engine using the time delay value to generate a space-time separation plot associated with the wavelet (e.g., using the stplot function in the tseriesChaos package). In particular, the space-time separation plot generated in operation 320 may represent the probability that two data points in the reconstructed phase-space has a distance smaller than epsilon ("ε"), which may depend on the spatial distance ε and the difference in time Δt between the points. As such, the space-time separation plot may include an accumulated histogram having the spatial distances ε at each time separation Δt, which may be displayed in the user interface. In one implementation, the human analyst may then read the space-time separation plot generated in operation 320 to estimate a Theiler time window needed to determine the embedding dimension, wherein the Theiler time window may include any positive integer that suitably indicates a minimum permissible time separation that nearest neighbors may have. In one implementation, the model discovery engine may then use the time delay value and the Theiler time window value to identify the embedding dimension associated with the wavelet in an operation 330 (e.g., using the false.nearest function in the tseriesChaos package to run a false nearest neighbors algorithm).

In one implementation, the model discovery engine may then use the time delay value, the Theiler time window value, and the embedding dimension value to determine a maximal Lyapunov exponent ("$\lambda$") associated with the wavelet in an operation 340. In particular, the $\lambda$ value determined in operation 340 may generally characterize the separation rate associated with infinitesimally close trajectories in a dynamical system, which typically have multiple $\lambda$ values equal in number to the dimensionality associated with the phase space. In this context, the maximal $\lambda$ value determined in operation 340 generally indicates the predictability associated with the dynamical system, wherein the dynamical system may be chaotic if the maximal $\lambda$ value has a positive value or dissipative if the maximal $\lambda$ value has a negative value.

Accordingly, in one implementation, the model discovery engine may check the maximal $\lambda$ value to check the predictability associated with the model in an operation 350. For example, if the maximal $\lambda$ value associated with most wavelets includes a zero or non-zero negative value, an operation 360 may include the model discovery engine determining that the model has dissipative characteristics, in which case the discovered model will not be used to forecast the volatility associated with any wavelet (i.e., because dissipative systems cannot fill the phase space volume). However, if the maximal $\lambda$ value associated with all or most wavelets includes a non-zero positive value, the model may be considered chaotic and determine whether or not to further examine the suitability associated with the derived model. For example, in response to determining that the model may be considered chaotic, an operation 370 may include the model discovery engine determining whether or not to plot entropy associated with the model, wherein the production engine may be invoked in an operation 390 to forecast the volatility associated with all wavelets if entropy will not be plotted and the maximal $\lambda$ value associated with all or most wavelets includes a non-zero positive value. However, if entropy will be plotted, the entropy plot may generally represent the order or disorder associated with the model, which may be examined in an operation 380 to evaluate whether any time periods associated with the model show an ordered system (i.e., that there was a time period over which the system was ordered and therefore deterministic, meaning that the production engine can likely produce a suitable volatility forecast therefrom). Accordingly, if there was a time period over which the system was ordered and therefore deterministic, the production engine may be invoked to forecast the volatility associated with all wavelets in operation 390, or alternatively volatility may not be forecasted if the entropy plot does not show any time periods over which the system was ordered (i.e., the system has non-deterministic traits).

Figure 4:
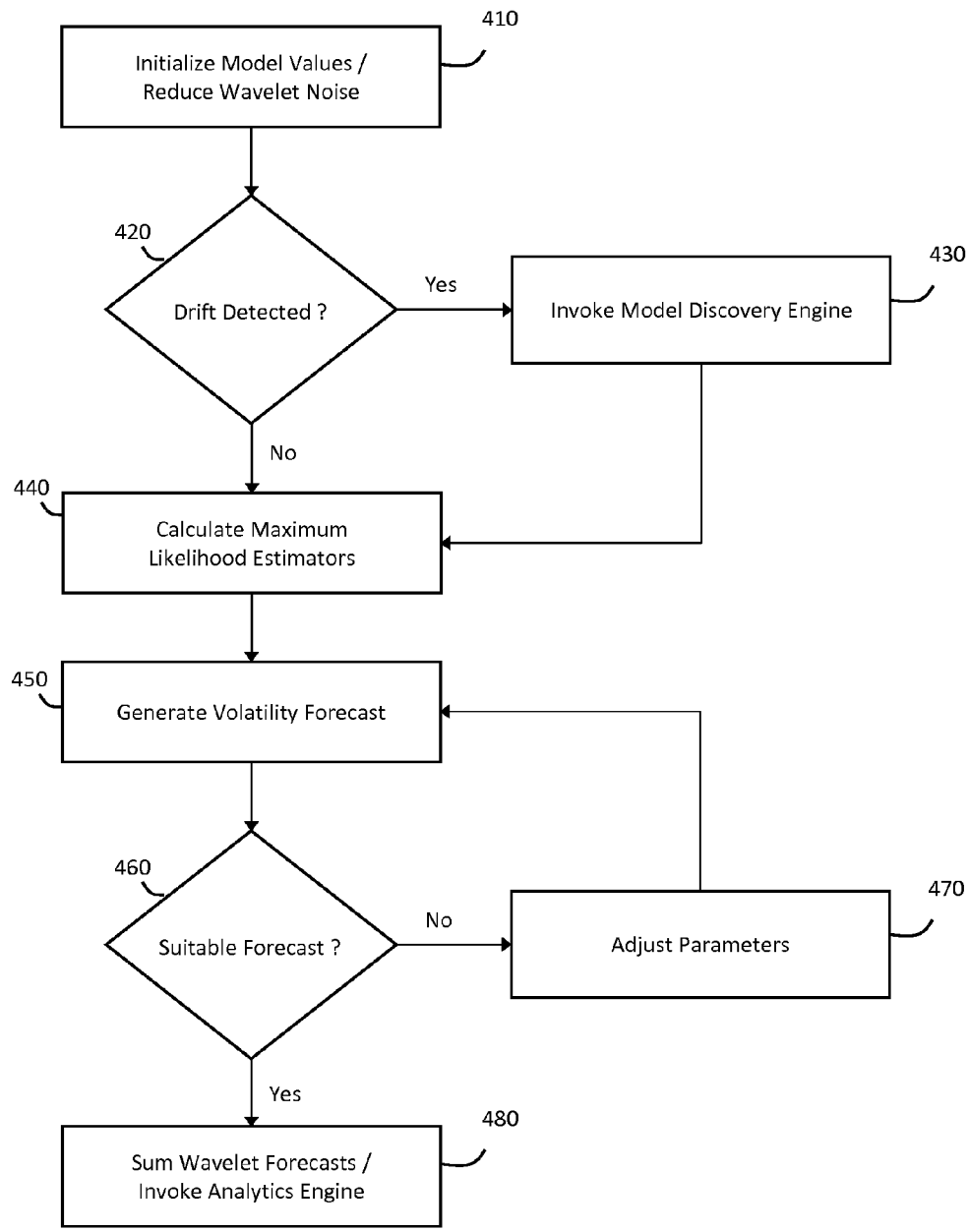
FIG. 4 illustrates an exemplary method to produce a realized volatility forecast via, wavelets and non-linear dynamics, according to one aspect of the invention.

According to one aspect of the invention, FIG. 4 illustrates an exemplary method 400 to produce a realized volatility forecast via wavelets and non-linear dynamics. In particular, the method 400 shown in FIG. 4 may including initializing the model with the values associated with the time delay setting and the embedding dimension setting at each resolution level in an operation 410. Additionally, in one implementation, operation 410 may further include determining a neighbors value at each resolution level, wherein a production engine may generally execute the forecasting operations described in operations 440 through 480 below with various different neighbor settings to determine the neighbors value. For example, a forecasting engine may be invoked with various different neighbor settings to evaluate which neighbor values produce forecasts that best conform to actual volatility. As such, the forecasting engine may then use the time delay value, the embedding dimension value, and the neighbors value to obtain a volatility prediction over a particular time period, wherein the prediction may be compared to actual volatility results to backtest the model values if the time period already occurred in the past, or alternatively the prediction may be considered the volatility forecast if the time period will occur in the future. In one implementation, operation 410 may further reduce noise associated with each wavelet prior to obtaining the volatility prediction, wherein an orthogonal projection onto a manifold using Euclidean or other suitable metrics may be performed to reduce the noise associated with each wavelet (e.g., using the ghkss function in the R package RTisean).

Moreover, in one implementation, an operation 420 may include determining a time when the volatility was previously forecasted and evaluating whether the model has drifted if the volatility was last forecasted more than a certain time in the past (e.g., if the volatility was last forecasted one year ago, operation 420 may include invoking the model discovery engine to re-discover the time delay value, the Theiler time window value, and the embedding dimension value). In one implementation, the current and previous values associated therewith may then be analyzed in operation 420 to determine whether the model has drifted, which may include a human analyst making a subjective decision relating to whether a substantial difference exists between the current and previous values. In one implementation, if the human analyst indicates that the model has drifted, the model discovery engine may be invoked in an operation 430 to update the values that configure the model to produce the volatility forecast.

In one implementation, to produce the volatility forecast, an operation 440 may include the forecasting engine obtaining the wavelets previously decomposed from the volatility time series, which may cover the time period leading up to and ending on the date from which the volatility will be forecasted. In one implementation, the forecasting engine may then calculate, using the method of delays (e.g., as used in the R package RTisean), a forecast associated with each vector in the reconstructed vector space. In one implementation, the forecasts calculated with the forecasting engine may use maximum likelihood estimators associated with various parameters in a fractionally-differenced autoregressive integrated moving average model (e.g., using the fracdiff function in the R package forecast), kernel regression, locally linear models, radial basis functions, or locally weighted linear functions. For example, the aforementioned method of delays may use the time delay and embedding values associated with each wavelet to reconstruct the phase space that the respective wavelets represent, wherein any of the listed algorithms may then use the vectors associated with the reconstructed phase space to produce the forecast associated with that wavelet. In one implementation, the forecasting engine may then use a time series model to produce the volatility prediction in an operation 450, wherein the volatility prediction may include a certain number of periods (e.g., twenty-one days out). In one implementation, in response to producing the volatility prediction associated with all individual wavelets, an operation 460 may include determining whether the volatility predictions associated with all wavelets are suitable. In one implementation, if the volatility predictions associated with any wavelets are determined to be non-suitable, an operation 470 may use cached values associated with such wavelets from a previous forecast (if available) to adjust the parameters and reproduce the volatility forecast, wherein the cached values from the previous forecast may be used to reproduce the volatility forecast because changes to the volatility series associated with a particular wavelet may often be relatively minor on a day-to-day basis. Alternatively, to reproduce the volatility prediction associated with any wavelet that appears essentially random at a given resolution level (e.g., no volatility pattern appears at a one or two day resolution level), operation 470 may use the mean and standard deviation associated with the wavelet series, change a distance metric parameter, not include a single orbit parameter, reduce a time delay, or modify any suitable combination of parameters and re-execute the volatility prediction in operation 450.

In one implementation, in response to having produced suitable volatility predictions associated with all wavelets, an operation 480 may include summing the various volatility predictions to obtain the final volatility prediction over the relevant time period. Additionally, operation 480 may analyze the final volatility prediction to assess the accuracy, predictability, or other suitability associated with the prediction. For example, operation 480 may include obtaining the actual volatility data over the relevant time period if available (i.e., where the time period occurred in the past) and generating statistics that indicate a correspondence between the predicted and actual volatility over the time period (e.g., correlation, Root Mean Square Error, etc.). Furthermore, the statistics may be generated in operation 480 to examine the correspondence between the predicted and actual volatility over various time scales (e.g., five, ten, fifteen, and twenty-one days).

Implementations of the invention may be made in hardware, firmware, software, or any suitable combination thereof. The invention may also be implemented as instructions stored on a machine-readable medium that can be read and executed on one or more processing devices. For example, the machine-readable medium may include various mechanisms that can store and transmit information that can be read on the processing devices or other machines (e.g., read only memory, random access memory, magnetic disk storage media, optical storage media, flash memory devices, or any other storage or non-transitory media that can suitably store and transmit machine-readable information). Furthermore, although firmware, software, routines, or instructions may be described in the above disclosure with respect to certain exemplary aspects and implementations performing certain actions or operations, it will be apparent that such descriptions are merely for the sake of convenience and that such actions or operations in fact result from processing devices, computing devices, processors, controllers, or other hardware executing the firmware, software, routines, or instructions. Moreover, to the extent that the above disclosure describes executing or performing certain operations or actions in a particular order or sequence, such descriptions are exemplary only and such operations or actions may be performed or executed in any suitable order or sequence.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A computer-implemented system for forecasting realized volatility via wavelets and non-linear dynamics, the system comprising:
   a computing device comprising one or more physical processors configured to:
      compute a volatility time series that includes daily volatility values associated with a security over a previous time period;
      decompose the volatility time series into a wavelet series, wherein the wavelet series decomposed from the volatility time series includes multiple wavelets that can be summed to reproduce the volatility time series;
      discover a time delay value, a Theiler value, and an embedding dimension value associated with each wavelet in the wavelet series;
      use the discovered time delay value and the discovered embedding dimension value to calculate maximum likelihood estimators associated with an autoregressive integrated moving average model and project volatility values associated with each wavelet in the wavelet series from the maximum likelihood estimators; and
      sum the projected volatility values associated with each wavelet in the wavelet series to produce a volatility prediction associated with the security.

2. The system recited in claim 1, wherein the daily volatility values in the volatility time series include standard deviations associated with daily return values that the security had over the previous time period.

3. The system recited in claim 1, wherein the time delay value associated with each wavelet in the wavelet series comprises a minimum value in an estimated Average Mutual Information index associated with the wavelet that appears subsequent to a first peak in the estimated Average Mutual Information index associated with the wavelet.

4. The system recited in claim 3, wherein the one or more physical processors are further configured to generate a space-time separation plot associated with each wavelet in the wavelet series from the time delay value associated with the wavelet, wherein the Theiler value associated with each wavelet in the wavelet series comprises a time window selected from the space-time separation plot associated with the wavelet.

5. The system recited in claim 4, wherein the one or more physical processors are further configured to pass the time delay value and the Theiler value associated with each wavelet in the wavelet series to a false nearest neighbors function to discover the embedding dimension value associated with each wavelet.

6. The system recited in claim 5, wherein the one or more physical processors are further configured to:
   determine a maximal Lyapunov exponent associated with each wavelet in the wavelet series from the time delay value, the Theiler value, and the embedding dimension value associated with each wavelet; and
   invoke a production engine to produce the volatility forecast in response to determining that the maximal Lyapunov exponent associated with all or most wavelets in the wavelet series has a non-zero positive value.

7. The system recited in claim 1, wherein the one or more physical processors are further configured to:

compare the discovered time delay value, the discovered Theiler value, and the discovered embedding dimension value associated with each wavelet to subsequently discovered values corresponding thereto; and rediscover the time delay value, the Theiler value, and the embedding dimension value associated with each wavelet in the wavelet series in response to the subsequently discovered values indicating that a substantial drift over time.

8. The system recited in claim 1, wherein the one or more physical processors are further configured to perform an orthogonal projection onto a manifold using Euclidean metrics to reduce noise associated with each wavelet in the wavelet series.

9. The system recited in claim 1, wherein the one or more physical processors are configured to project the volatility values associated with each wavelet over a future time period to forecast the volatility associated with the security over the future time period.

10. The system recited in claim 1, wherein the one or more physical processors are further configured to:
obtain actual volatility values associated with the security over the previous time period;
compare the actual volatility values associated with the security over the previous time period to the projected volatility values to test the discovered time delay value, the discovered Theiler value, and the discovered embedding dimension value; and
generate statistics indicating a correspondence between the actual volatility values and the projected volatility values associated with the security over the previous time period, wherein the generated statistics includes a correlation or root mean square error between the actual volatility values and the projected volatility values over one or more time scales.

11. The system recited in claim 1, wherein the multiple wavelets that can be summed to reproduce the volatility time series include multiple detail wavelets that correspond to the volatility time series over respective time spans and a smoothed wavelet that represents a mean or long-term average associated with the volatility time series.

12. A computer-implemented method of forecasting realized volatility via wavelets and non-linear dynamics, the method being implemented on a computer system comprising one or more physical processors, the method comprising:
computing, by the one or more physical processors, a volatility time series that includes daily volatility values associated with a security over a prior time period;
decomposing the volatility time series into a wavelet series, wherein the wavelet series decomposed from the volatility time series includes multiple wavelets that can be summed to reproduce the volatility time series;
discovering a time delay value, a Theiler value, and an embedding dimension value associated with each wavelet in the wavelet series;
using the discovered time delay value and the discovered embedding dimension value to calculate, by the one or more physical processors, maximum likelihood estimators associated with an autoregressive integrated moving average model and project volatility values associated with each wavelet in the wavelet series from the maximum likelihood estimators; and
summing, by the one or more physical processors, the projected volatility values associated with each wavelet in the wavelet series to produce a volatility prediction associated with the security.

13. The method recited in claim 12, wherein the daily volatility values in the volatility time series include standard deviations associated with daily return values that the security had over the prior time period.

14. The method recited in claim 12, wherein the time delay value associated with each wavelet in the wavelet series comprises a minimum value in an estimated Average Mutual Information index associated with the wavelet that appears subsequent to a first peak in the estimated Average Mutual Information index associated with the wavelet.

15. The method recited in claim 14, further comprising generating a space-time separation plot associated with each wavelet in the wavelet series from the time delay value associated with the wavelet, wherein the Theiler value associated with each wavelet in the wavelet series comprises a time window selected from the space-time separation plot associated with the wavelet.

16. The method recited in claim 15, further comprising passing the time delay value and the Theiler value associated with each wavelet in the wavelet series to a false nearest neighbors function to discover the embedding dimension value associated with each wavelet.

17. The method recited in claim 16, further comprising:
determining a maximal Lyapunov exponent associated with each wavelet in the wavelet series from the time delay value, the Theiler value, and the embedding dimension value associated with each wavelet; and
invoking a production engine to produce the volatility forecast in response to determining that the maximal Lyapunov exponent associated with all or most wavelets in the wavelet series has a non-zero positive value.

18. The method recited in claim 12, further comprising:
comparing the discovered time delay value, the discovered Theiler value, and the discovered embedding dimension value associated with each wavelet to subsequently discovered values corresponding thereto; and
rediscovering the time delay value, the Theiler value, and the embedding dimension value associated with each wavelet in the wavelet series in response to the subsequently discovered values indicating that a substantial drift over time.

19. The method recited in claim 12, further comprising performing an orthogonal projection onto a manifold using Euclidean metrics to reduce noise associated with each wavelet in the wavelet series.

20. The method recited in claim 12, wherein the volatility values associated with each wavelet are projected over a future time period to forecast the volatility associated with the security over the future time period.

21. The method recited in claim 12, further comprising:
obtaining actual volatility values associated with the security over the prior time period;
comparing the actual volatility values associated with the security over the prior time period to the projected volatility values to test the discovered time delay value, the discovered Theiler value, and the discovered embedding dimension value; and
generating statistics indicating a correspondence between the actual volatility values and the projected volatility values associated with the security over the prior time period, wherein the generated statistics includes a correlation or root mean square error between the actual volatility values and the projected volatility values over one or more time scales.

22. The method recited in claim 12, wherein the multiple wavelets that can be summed to reproduce the volatility time series include multiple detail wavelets that correspond to the volatility time series over respective time spans and a smoothed wavelet that represents a mean or long-term average associated with the volatility time series.

23. A computer program product for enabling a computer to forecast realized volatility via wavelets and non-linear dynamics, comprising:

software instructions for enabling a computer to perform predetermined operations; and a computer readable medium bearing the software instructions;

the predetermined operations comprising:

computing a volatility time series that includes daily volatility values associated with a security over a prior time period;

decomposing the volatility time series into a wavelet series, wherein the wavelet series decomposed from the volatility time series includes multiple wavelets that can be summed to reproduce the volatility time series;

discovering a time delay value, a Theiler value, and an embedding dimension value associated with each wavelet in the wavelet series;

using the discovered time delay value and the discovered embedding dimension value to calculate maximum likelihood estimators associated with an autoregressive integrated moving average model and project volatility values associated with each wavelet in the wavelet series from the maximum likelihood estimators; and summing the projected volatility values associated with each wavelet in the wavelet series to produce a volatility prediction associated with the security.

* * * * *